United States Patent Office 3,489,504
Patented Jan. 13, 1970

3,489,504
ETHERIFICATION OF CELLULOSIC MATERIALS AND STARCH WITH FLUORINATED MONO-OLEFINS ALONE OR IN CONJUNCTION WITH FLUORINATED POLYOLEFINS
Robert D. Englert, Sierra Madre, Ronald Swidler, Pasadena, Lester P. Berriman, Arcadia, and Robert H. Wade, Altadena, Calif., assignors, by mesne assignments, to Koratron Company, Inc., a corporation of California
No Drawing. Filed Feb. 15, 1965, Ser. No. 432,878
The portion of the term of the patent subsequent to Nov. 21, 1984, has been disclaimed
Int. Cl. D06m 13/00
U.S. Cl. 8—120                  17 Claims

ABSTRACT OF THE DISCLOSURE

Alkaline catalyzed reaction of cellulosic materials and starch with perfluoromonoolefins alone or with perfluoromonoolefins in conjunction with perfluoropolyenes. Cotton fabric having improved water repellency is among the products produced.

---

The present invention is directed to a process for treating cellulosic and other naturally occurring organic materials such as starch which have accessible hydroxyl groups with perfluoromonoolefins and the products produced thereby. The present invention is particularly useful for the treatment of cellulosic materials such as cotton to provide a variety of highly desirable properties including water resistance and soil resistance to such materials.

Although a substantial amount of research and development work has been devoted to the chemical modification of cellulosic materials in recent years, many commercially available cellulosic fabric which have been chemically treated do not possess permanent water resistance and/or permanent soil resistance. Rather, as is well known to the consumers of these articles, the water repellency of many raincoats and the like comprising treated cellulosic fibers is substantially destroyed by laundering and other cleaning methods with the result that subsequent treatment is necessary to restore water and/or soil resistance. The present invention provides an extremely convenient and effective method for permanently imparting water resistance and soil resistance to cellulosic and similar materials.

It is an object of the present invention to provide a process for imparting permanent water resistance and soil resistance to cellulosic materials and the like.

It is another object of the present invention to provide a process for reacting cellulosic materials and the like with perfluoromonoolefins in the presence of a basic catalyst.

Other objects and advantages of the present invention, it is believed, will be apparent from the following detailed description of specific embodiments thereof.

Briefly, the present invention comprises the treatment of naturally occurring organic materials having accessible hydroxyl groups, e.g., cotton, regenerated cellulose, starch, etc., with perfluoromonoolefins, which preferably contain an unsaturated terminal group. Thus, the perfluoro compositions which may be used in the present invention may have the formula:

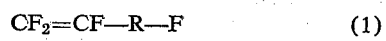

$$CF_2=CF-R-F \qquad (1)$$

wherein R may be $(CF_2)_n$ or may be branched chain perfluoro radical. The value of $n$ in $(CF_2)_n$ is limited only by the extent to which long chains will prevent penetration of the perfluoro compound into the interior of the cellulosic or other molecules and thereby prevent effective reaction. However, since such penetration may be aided by swelling the cellulosic or other material or by appropriate solvent exchange systems, and since such penetration wil depend on the nature of the cellulosic or other material, the quantitative limit on $n$ will vary in different reaction systems.

The use of perfluoroheptene-1 has been found highly satisfactory in the present invention, but it is to be emphasized that any compounds which meet the foregoing requirements may be used. In addition, alicyclic perfluoromonoolefins such as perfluorocyclobutene may be used.

Although the present invention is not to be limited to any particular theory of operation, it is believed that the perfluoromonoolefins react with the hydroxyl groups in the cellulosic or other materials with which they are reacted to produce ether linkages. Thus, it is believed that the products of these reactions may be considered to be perfluoroalkyl ethers of cellulose and similar materials. It is further believed that terminal unsaturated groups on the perfluoromonoolefins will react most readily with hydroxyl groups on cellulose molecules to produce ethers.

Among the many unique features of the present invention is the facility with which cotton may be reacted under non-degredative conditions. As is well known to those skilled in the art, many reactions which can be performed with some cellulosic materials cannot be performed, or can be performer only with great difficulty, when cotton is used. Thus, the process of the present invention is rather unique in this regard.

Another important feature of the present invention is that it permits cotton and similar fabrics to be rendered water repellant without substantially decreasing the permeability of such fabrics to water vapor. Thus, a fabric treated according to the present invention will have increased water repellency and will also be able to "breathe" because of its permeability to water vapor.

The reactions of the present invention must be carried out in the presence of a basic catalyst. However, this may be accomplished in several ways. For example, the perfluoromonoolefin may simply be admixed in an aqueous solution of a base such as sodium hydroxide or potassium hydroxide. Alternatively, the cotton or similar material may first be treated with a base and then fumigated with monolefin vapor. It has been found that, in general, when the fumigation method is used, less perfluoromonoolefin is required to produce apparently equivalent changes in the characteristics of the material treated than when treatment in aqueous solution is employed.

The present invention is further illustrated by the following examples in which all proportions are expressed in parts or percent by weight.

EXAMPLE I

A piece of cotton fabric was shaken vigorously in a sealed tube containing 100 ml. of an aqueous solution containing 10% potassium hydroxide and 25 gms. of perfluoroheptene-1 for four days. This material was then tested for water resistance according to ASTM test D583–58 and for oil resistance by placing a drop of mineral oil on the fabric and observing the time of penetration. In the former test, 100% water repellency is maximum.

The water repellency of the fabric treated according to this example was found to be 70% and the oil resistance was found to be greater than 48 hours. These test results compared very favorably with a control sample which was not treated with perfluoroheptene-1 and which was found to have a water repellency of 0% and which was found to have no oil resistance.

The amount of fluorine added to the cotton fabric treated according to this example was found to be 4.8%.

EXAMPLE II

A piece of cotton fabric measuring 8" by 11" was sealed in a thick-walled glass tube together with 35 ml. of a 5% solution of sodium hydroxide and 1 gm. of perfluoroheptene-1 and the tube was shaken vigorously for 96 hours at room temperature. A control was run simultaneously and treated in exactly the same way with the exception of the addition of perfluoroheptene-1. The cotton fabric was then removed and rinsed in running water for three hours and dried overnight at room temperature.

Water repellency was determined in the same manner as in Example I. It was found that the water repellency of the perfluoroheptene-1 treated sample of this example was 100% as compared with 0% for the control. The tensile strength and tear strength of the treated sample and the control were also determined and it was found that the tensile strength of the treated sample was 49.4 lbs. and that the tear strength was 49 lbs. as compared with corresponding values of 55.2 lbs. and 50 lbs. for the control.

The fluorine content of the treated sample was found to be about 0.35%. The moisture regain of the treated sample was found to be 6.84% which establishes that this fabric will both absorb and transmit water vapor while resisting the passage of liquid water.

EXAMPLE III

A cotton fabric was treated in the same manner as that described in Example II with the exception that 0.1 gm. of perfluoroheptene-1 rather than 1 gm. was used. As in Example II, a control sample was also run and the water repellency and strengths of these fabrics were tested. The sample treated with perfluoroheptene-1 was found to have a water repellency of 60%, a tensile strength of 54.5 lbs. and a tear strength of 50 lbs. The corresponding values of the control were 0%, 55.4 lbs. and 50 lbs.

The amount of fluorine added to the cotton fabric treated with perfluoroheptene-1 was found to be about 0.07%.

The amount of fluorine which may be added to the cellulosic or similar material according to the present invention will vary depending upon the final properties desired, but it has been found that add-ons of fluorine in the range from about 0.05% to about 5% by weight and higher may be used.

The process of the present invention may be performed sequentially or simultaneously with treatment with a perfluoropolyene having at least two unsaturated terminal groups. The latter treatment is described in detail in applicants' copending application Serial No. 432,863, filed on the same date as the present application, which application is incorporated by reference herein and which has matured into United States Patent No. 3,353,904. When such combined treatment is employed, the material being treated is provided with extremely high wrinkle recovery capabilities because of the crosslinking which results from treatment with the polyene. Among the polyenes which may be used are perfluorobutadiene, 1,3,5-octafluorohexatriene and 2-trifluoromethyl-1,3-butadiene. Thus, such combined treatment forms a part of the present invention.

Having fully described the present invention, it is to be understood that it is not to be limited to the specific details set forth, but is of the full scope of the appended claims.

We claim:
1. A process comprising reacting a cellulosic material with a perfluoromonoolefin having the formula $CF_2=CFRF$ wherein R is selected from the group consisting of branched chain perfluoro radicals and $(CF_2)_n$ and $n$ is a whole number limited in size to result in a molecule which will penetrate the interior of said cellulosic material, said reaction being carried out in the presence of a basic catalyst.

2. A process comprising reacting cotton with a perfluoromonoolefin having the formula $CF_2=CFRF$ wherein R is selected from the group consisting of branched chain perfluoro radicals and $(CF_2)_n$ and $n$ is a whole number limited in size to result in a molecule which will penetrate the interior of said cotton, said reaction being carried out in the presence of a basic catalyst.

3. A process comprising reacting starch with a perfluoromonoolefin having the formula $CF_2=CFRF$ wherein R is selected from the group consisting of branched chain perfluoro radicals and $(CF_2)_n$ and $n$ is a whole number limited in size to result in a molecule which will penetrate the interior of said starch, said reaction to be carried out in the presence of a basic catalyst.

4. A process comprising reacting perfluoroheptene-1 with a cellulosic material in the presence of a basic catalyst.

5. A process comprising reacting perfluoroheptene-1 with cotton in the presence of a basic catalyst.

6. The process of claim 5 wherein said basic catalyst is an alkali metal hydroxide.

7. The process of claim 5 wherein said reaction is allowed to proceed until about 0.05% to about 5% fluorine by weight has combined with said cotton.

8. A process comprising reacting a perfluoromonoolefin with a cellulosic material and cross-linking said cellulosic material by reacting it with a perfluoropolyene having at least two unsaturated terminal groups, each of said reactions being carried out in the presence of a basic catalyst.

9. The process of claim 8 wherein said reactions are carried out simultaneously.

10. The process of claim 8 wherein said cellulosic material is cotton.

11. A composition comprising the reaction product of cellulose and a perfluoromonoolefin having the formula $CF_2=CFRF$ wherein R is selected from the group consisting of branched chain perfluoro radicals and $(CF_2)_n$ and $n$ is a whole number limited in size to result in a molecule which will penetrate the interior of said cellulose.

12. A composition comprising the reaction product of cotton and a perfluoromonoolefin having the formula $CF_2=CFRF$ wherein R is selected from the group consisting of branched chain perfluoro radicals and $(CF_2)_n$ and $n$ is a whole number limited in size to result in a molecule which will penetrate the interior of said cotton.

13. A composition comprising a perfluoroheptyl ether of cellulose.

14. A composition comprising a perfluoroheptyl ether of cotton.

15. The composition of claim 14 wherein the fluorine in said perfluoroheptyl ether groups is present in an amount from about 0.05% to about 5% by weight.

16. A cotton fabric having a water repellency of at least about 50 percent, said fabric comprising cotton which has been reacted with a perfluoromonoolefin having the formula $CF_2=CFRF$ wherein R is selected from the group consisting of branched chain perfluoro radicals and $(CF_2)_n$ and $n$ is a whole number limited in size to result in a molecule which will penetrate the interior of said cotton fabric.

17. The fabric of claim 16 wherein said perfluoromonoolefin is perfluoroheptene-1.

References Cited

UNITED STATES PATENTS 2,479,474 10/1946 Hanford et al. _____ 8—120 X

OTHER REFERENCES

Park et al.: J.A.C.S., vol. 71, pp. 2337–2339 (1949).
Barr et al.: J.A.C.S., vol. 72, pp. 4480–4482 (1950).
Brice et al.: J.A.C.S., vol. 75, pp. 2698–2702 (1953).

GEORGE F. LESMES, Primary Examiner

J. CANNON, Assistant Examiner

U.S. Cl. X.R.

117—135.5; 260—231, 233.3